United States Patent
Balcha (10) Patent No.: US 11,586,507 B2
(45) Date of Patent: Feb. 21, 2023

(54) SCALABLE CLOUD-BASED BACKUP METHOD

(71) Applicant: Trilio Data, Inc., Framingham, MA (US)

(72) Inventor: Murali Balcha, Holliston, MA (US)

(73) Assignee: Trilio Data, Inc., Framingham, MA (US)

( * ) Notice: Subject to any disclaimer, the term of this patent is extended or adjusted under 35 U.S.C. 154(b) by 114 days.

(21) Appl. No.: 16/923,759

(22) Filed: Jul. 8, 2020

(65) Prior Publication Data

US 2021/0011811 A1 Jan. 14, 2021

Related U.S. Application Data

(60) Provisional application No. 62/873,618, filed on Jul. 12, 2019.

(51) Int. Cl.
*G06F 12/00* (2006.01)
*G06F 11/14* (2006.01)
(Continued)

(52) U.S. Cl.
CPC ...... *G06F 11/1464* (2013.01); *G06F 9/45558* (2013.01); *G06F 11/1451* (2013.01);
(Continued)

(58) Field of Classification Search
CPC .. G06F 3/065; G06F 11/1451; G06F 11/1469; G06F 2201/84; G06F 16/128;
(Continued)

(56) References Cited

U.S. PATENT DOCUMENTS 10,963,349 B2 * 3/2021 Dhamdhere ........ G06F 11/1451
2009/0276591 A1 11/2009 Mu et al.
(Continued)

FOREIGN PATENT DOCUMENTS

KR 10-2016-0078795 A 7/2016

OTHER PUBLICATIONS

International Preliminary Report on Patentability received for PCT Application Serial No. PCT/US2020/041203 dated Jan. 27, 2022, 9 pages.
(Continued)

*Primary Examiner* — John A Lane
(74) *Attorney, Agent, or Firm* — Rauschenbach Patent Law Group, LLC; Kurt Rauschenbach (57) ABSTRACT

A computer-implemented system and method of backing up and restoring a containerized application or a cloud-based application using a datamover service includes determining a stateful set of services of the containerized application or cloud-based application to be backed up. A persistent volume associated with the determined stateful set of services of the containerized application or cloud-based application is identified. Then, a snapshot of the identified persistent volume is created and a new persistent volume is created from the snapshot. The created new persistent volume is attached to a datamover service. Data from the created new persistent volume is then copied to a network file system or storage system using the datamover service, thereby creating backup data stored in a storage system.

22 Claims, 11 Drawing Sheets (51) Int. Cl.
  *G06F 9/455* (2018.01)
  *G06F 16/11* (2019.01)
(52) U.S. Cl.
  CPC ........ *G06F 11/1469* (2013.01); *G06F 16/128* (2019.01); *G06F 2009/45579* (2013.01); *G06F 2009/45595* (2013.01); *G06F 2201/84* (2013.01)
(58) Field of Classification Search
  CPC . G06F 11/1461; G06F 11/2056; G06F 16/162
  See application file for complete search history.

(56) References Cited

U.S. PATENT DOCUMENTS

| | | | |
|---|---|---|---|
| 2015/0127612 A1 | 5/2015 | Balcha et al. | |
| 2016/0034481 A1 | 2/2016 | Kumarasamy et al. | |
| 2017/0244593 A1 | 8/2017 | Rangasamy et al. | |
| 2019/0065323 A1* | 2/2019 | Dhamdhere | G06F 11/1484 |
| 2019/0082026 A1* | 3/2019 | Wu | H04L 9/0894 |
| 2020/0241754 A1* | 7/2020 | Bett | G06F 3/0619 |
| 2020/0310915 A1* | 10/2020 | Alluboyina | G06F 11/1469 |
| 2020/0409802 A1* | 12/2020 | Lim | G06F 11/1464 |
| 2022/0019350 A1* | 1/2022 | Karr | G06F 3/0617 |
| 2022/0019367 A1* | 1/2022 | Freilich | G06F 3/0659 |

OTHER PUBLICATIONS

"Notification of Transmittal of the International Search Report and the Written Opinion of the International Searching Authority, or the Declaration" for International Patent Application No. PCT/US2020/041203, dated Oct. 22, 2020, 12 pages, International Searching Authority, Korean Intellectual Property Office, Daejeon, Republic of Korea.

* cited by examiner

400 —
```
apiVersion: app.k8s.io/v1beta1
kind: Application
metadata:
    name: "wordpress-01"
    labels:
       app.kubernetes.io/name: "wordpress-01"
       app.kubernetes.io/version: "3"
```

402 —
```
backup:
   startdate: 04/01/2019
   interval: 4 hrs
   retention: 30
   retention_type: snapshots
```

```
spec:
   selector:
      matchLabels:
         app.kubernetes.io/name: "wordpress-01"
   componentkinds:
      - group: core
```

FIG. 4A

450 —
```
apiVersion: app.k8s. io/v1beta1
kind: Application
metadata:
    name: "wordpress-01"
    labels:
       app.kubernetes.io/name: "wordpress-01"
       app.kubernetes.io/version: "3"
```

452 —
```
restore:
   restore_url: app.trilio.io/v1beta1/backupguid/snapshotguid
spec:
```

```
   selector:
      matchLabels:
         app.kubernetes.io/name: "wordpress-01"
   componentkinds:
      - group: core
          kind: Service
      - group: apps
```

SCALABLE CLOUD-BASED BACKUP METHOD

CROSS REFERENCE TO RELATED APPLICATION

The present application is a non-provisional application of U.S. Provisional Patent Application No. 62/873,618, filed on Jul. 12, 2019, entitled "Scalable Cloud-Based Backup Method". The entire contents of U.S. Provisional Patent Application No. 62/873,618 are herein incorporated by reference.

The section headings used herein are for organizational purposes only and should not be construed as limiting the subject matter described in the present application in any way.

INTRODUCTION

OpenStack® and other cloud-based deployments are growing at an astounding rate. Furthermore, these deployments are relying more on containerized applications. Market research indicates that a large fraction of enterprises will be deploying some form of cloud infrastructure to support applications services, either in a public cloud, private cloud or some hybrid of a public and a private cloud. This trend leads more and more organizations to use this type of open-sourced cloud management and control software to build out and operate these clouds. Data loss is a major concern for enterprises deploying this and other cloud management and control software. Unscheduled downtime has a dramatic financial impact on businesses. As such, backup and recovery methods and systems which recover from data loss and data corruption scenarios for application workloads executing on OpenStack® clouds and/or clouds that execute over containerized environments that use, e.g. Kubernetes® and OpenShift® are needed.

One challenge is that the systems and applications being backed up may scale to very large numbers of nodes and may be widely distributed. Objectives for effective backup of these systems include reliable recovery of workloads with a significantly improved recovery time objective and recovery point objective. These backup systems must be able to scale to large, cloud-based deployments.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

The method and system of the present teaching provides backup operations for distributed computing environments, such as clouds, private data centers and hybrids of these environments. One feature of the method and system of the present teaching is that they provide backup operations using object storage systems as a backup target. The application and system being backed up may be a cloud computing system, such as, for example, a system that is executing using a Kubernetes® and/or OpenShift® software platform in a cloud environment. Kubernetes® is an open-source project and framework for cloud computing for container orchestration and automated application deployment, scaling and management. OpenShift® is open source software offered by Red Hat that is a container application platform based on top of Docker containers and Kubernetes® container cluster manager platforms. It should be understood that the present teachings are not limited to use with Kubernetes® and/or OpenShift® software platforms and that they can apply to any type of cloud-based computing system and/or container environment that makes virtual servers and other virtual computing resources available as a service to customers.

Information technology administrators are growing more and more comfortable executing legacy applications in cloud-based containerized environments. Some information technology organizations are even considering migrating traditional operating systems, such as a Windows®-based operating system and workloads from traditional virtualization platforms to cloud-based environments. Still, many of the information technology workloads in a typical enterprise are mixed to contain some portion of cloud-based applications and some portion of legacy applications.

Methods and systems of the present teaching apply to back up of applications and systems implemented in any combination of the above configurations. As will be clear to those skilled in the art, various aspects of the system and various steps of the method of the present teaching are applicable to other known computing environments, including private and public data centers and/or cloud and/or enterprise environments that execute using a variety of control and management software platforms.

Backup and disaster recovery become important challenges as enterprises evolve OpenStack®, OpenShift® and/or Kubernetes® and similar projects from evaluation to production. Corporations use backup and disaster recovery solutions to recover data and applications in the event of total outage, data corruption, data loss, version control (roll-back during upgrades), and other events. Organizations typically use internal service-level agreements for recovery and corporate compliance requirements as a means to evaluate and qualify backup and recovery solutions before deploying the solution in production.

Complex business-critical information technology environments must be fully protected with fast, reliable recovery operations. One of the biggest challenges when deploying cloud-based systems in an organization is the ability to provide a policy-based, automated, comprehensive backup and recovery solution. Cloud-based systems offer some application programming interfaces (APIs) that can be used to generate a backup; however, these APIs alone are not sufficient to implement and manage a complete backup solution. In addition, each cloud deployment is unique, at least in part because the systems are modular, with multiple options to implement cloud-based applications and containerized applications. Users have a choice of various hypervisors, storage subsystems, network vendors, projects and various open source management and orchestration platforms.

One feature of the present teaching is that it is a software-application-based solution that supports cloud system backup on a massive scale. The scale includes not only a number of applications, workloads, VMs, and other processing components, but the scale over a distributed system of these processing components. A key to the scaling is that the architecture provides that the control plane and data plane each scale independently. The method and system of the present teaching provides a native solution for various platforms, such as the Red Hat OpenStack® Platform (RHOSP) and the Red Hat virtualization (RHV), as examples.

In known cloud-based backup systems, the unit of backup is the volume or virtual machine. In cloud-based backup systems of the present teaching, the unit of backup is a workload instead of volume or VM. That is, embodiments of the system and method of the present teaching back up the application services and associated storage themselves, not a snapshot of a virtual machine that is executing those applications. Embodiments of the system and method of the present teaching can provide persistent incremental backup.

Embodiments of the backup system and method of the present teaching can leverage one or more open-software storage platforms, such as Ceph, and associated incremental backup schemes that find differences between two snapshot copies, Ceph snapdiff APIs. This feature provides efficient backups. The system and method support, for example, file formats for disk images, and Qcow2 format for backup images. The system and method are flexible and supports multiple protocols for distributed storage, for example, network file system (NFS) and Amazon simple storage service (S3) compatible object stores.

The backup system and method of the present teaching can be constructed as a native service that uses an operator framework and an associated manager. For example, one specific embodiment is built for Red Hat's Operator Framework, and managed by Operator Lifecyle Manager (OLM).

The backup system and method of the present teaching can scale and balance resources to meet performance automatically, and has design features to ensure high availability and durability. The backup system and method rely on declarative APIs instead of imperative APIs. The backup system and method also leverage software services for moving data in a scalable way in large cloud environments. For example, the backup system and method of the present teaching can be a containerized application that is implemented on a pod in a Kubernetes® cluster. A pod is the smallest deployable unit of computing in a container environment. A pod represents one or more containers that operate together to implement, for example, a particular service. For example, pods may share networking and storage resources as well as specifications that determine how the pod executes. A feature of pods is that, although they represent an integrated application/service, they are not restricted to run on the same virtual or physical machine.

For example, some embodiments of the present teaching use a Datamover microservice pod commercially available from Tilio Data Inc., located in Framingham, Mass., for backup and restore, which advantageously scales with the number of backup jobs. The backup system and method of the present teaching support backup and/or recovery operations including, for example, disaster recovery and copy data management. Another feature of the systems and methods of the present teaching is that they do not require media servers or staging areas for backups.

Another feature of embodiments of the system and method of the present teaching is that they can efficiently perform incremental and full backups for cloud-based processing systems that utilize applications with containerized workloads and services. A so-called containerized application runs on a host, which may be a physical host or a virtual machine. Importantly, a containerized application does not use a guest operating system and associated layered file system. This is in contrast to an application that runs monolithically on a virtual machine or a physical machine using a guest operating system. Because a container does not utilize its own operating system, it can be more efficient in terms of resource usage. The container can be customized to provide only the services required by the application. In addition, containers are generally more ephemeral than virtual machines, thus providing more flexibility and rapid scalability for applications.

Many of the examples of the system and method of the present teaching described herein backup cloud-based applications that run using Kubernetes®. Kubernetes® is a platform for managing containerized workloads and services. The system and method of the present teaching can be applied to application backup for a variety of known containerization platforms.

Figure 1A:
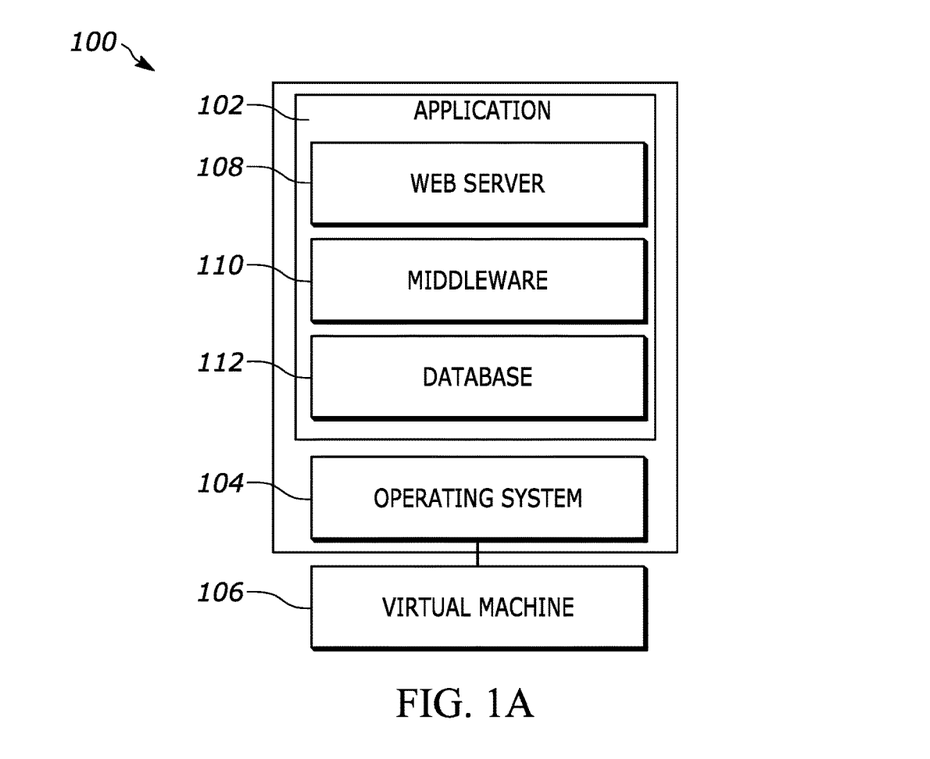
FIG. 1A illustrates a stack for an application that executes using a virtual machine.

FIG. 1A illustrates a stack 100 for an application that runs using a virtual machine 106. As can be seen from the figure, the application 102 is set monolithically over the operating system 104 that is executing on a virtual machine 106. The application services include web server 108, middleware 110, and database 112 services that run using the operating system 104.

Figure 1B:
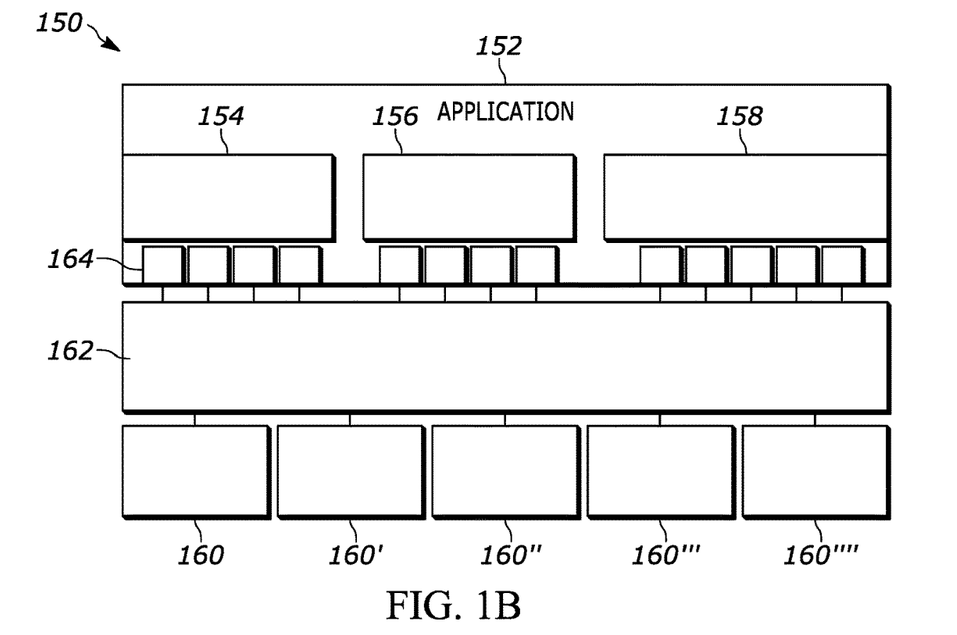
FIG. 1B illustrates a stack for a containerized application that executes using a container system.

FIG. 1B illustrates a stack 150 for a containerized application that runs using a container system. The application 152 includes microservices 154, 156, 158 connected to processing machines 160, 160', 160", 160'", 160"" via a container management system 162. In various embodiments, the processing machines 160, 160', 160", 160'", 160"" can be physical machines or virtual machines or a combination. The container management system 162 is connected to the various services 154, 156, 158 of the application 152 using various computing units 164. The computing units 164 generally include one or more containers that are typically collocated and scheduled as a unit to support a particular compute capability, or set of capabilities (e.g. networking, processing, storage) that are needed for the various services 154, 156, 158 to which they connect. The container management system 162 manages the computing units 164 that run on the computing resources provided by the underlying processing machines 160, 160', 160", 160'", 160'.

Figure 2:
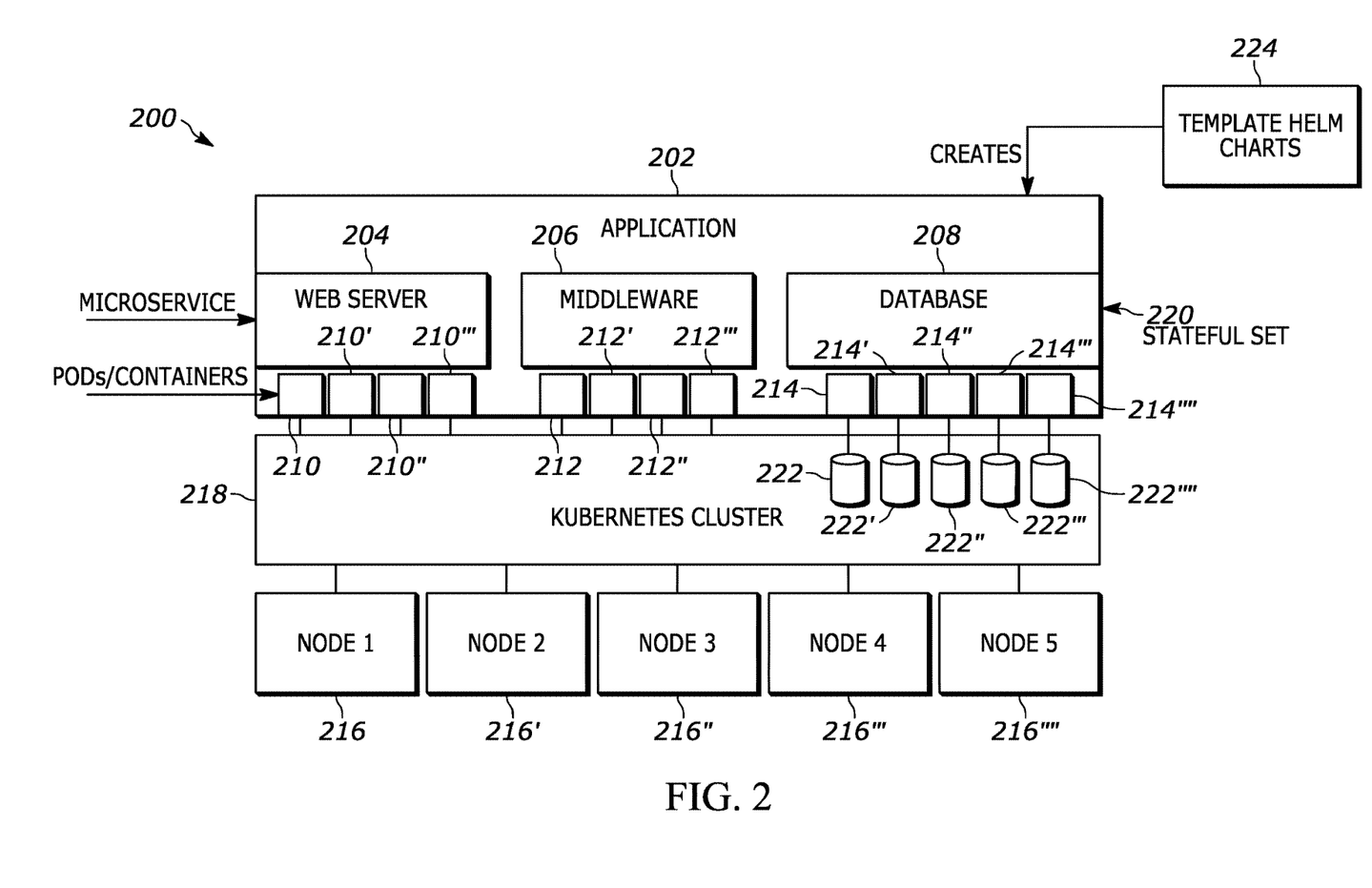
FIG. 2 illustrates a containerized application stack for an application to be backed up executing a Kubernetes® cluster using an embodiment of the system and method of the present teaching.

FIG. 2 illustrates a containerized application stack 200 for an application 202 to be backed up executing using a Kubernetes® cluster using an embodiment of the system and method of the present teaching. The application 202 includes three microservices, a web server service 204, a middleware service 206, and a database service 208. Each microservice 204, 206, 208 runs using multiples pods 210, 210', 210", 210'", 212, 212', 212", 212'", 214, 214', 214", 214'", 214"". The web server service 204 uses four pods 210, 210', 210", 210'. The middleware service 206 uses four pods 212, 212', 212", 212'". The database service 208 uses five pods 214, 214', 214", 214'", 214"". In some embodiments, each pod 210, 210', 210", 210'", 212, 212', 212", 212'", 214, 214', 214", 214'", 214"" comprises one or more Docker containers, which is a set of coupled software-as-a-service and platform-as-a-service products that use operating-system-level virtualization to develop and deliver software in containers. The pods 210, 210', 210", 210'", 212, 212', 212", 212'", 214, 214', 214", 214'", 214"" run on five Kubernetes® nodes 216, 216', 216", 216'", 216"", that may be virtual processing machines or physical processing machines. A Kubernetes® cluster 218 manages the pods 210, 210', 210", 210'", 212, 212', 212", 212'", 214, 214', 214", 214', 214"" and the nodes 216, 216', 216", 216'", 216"". The Kubernetes® cluster 218 includes a control plane, that is a collection of processes executing on the cluster, and a master that is a collection of three processes that run on a single one of the nodes 216, 216', 216", 216'", 216"" on the cluster. The three processes for the master are an API server, controller manager, and a scheduler.

Comparing stack 200 with the generalized container application stack 150 of FIG. 1B, and referring to both FIG. 1B and FIG. 2, the computing units 164 are equivalent to the pods 210, 210', 210", 210'", 212, 212', 212", 212'", 214, 214', 214", 214'", 214"". The management system 162 is equivalent to the Kubernetes® cluster 218. The underlying processing machines 160, 160', 160", 160'", 160"" are equivalent to the nodes 216, 216', 216", 216'", 216"".

Managing storage is distinct from managing computation. A persistent volume (PV) is a piece of storage in a Kubernetes® cluster. The Kubernetes® application 202 has a stateful set 220 for the database service 208. The database service 208 pods 214, 214', 214", 214'", 214"" require ordering and uniqueness. Each pod 214, 214', 214", 214'", 214"" has an associated persistent volume 222, 222', 222", 222'", 222"" in the Kubernetes® cluster 218. In some embodiments, the persistent volumes are pieces of storage in the cluster that may be provisioned statically by an administrator, or dynamically provisioned using storage classes, or profiles of the storage based on, for example, quality of service, type, and/or backup or other policies.

The application 202 is created from a template Helm chart 224. Helm is an open-source package manager for Kubernetes®. Helm is based on Helm charts, such as template Helm chart 224. In general, Helm charts are used to define, install and upgrade Kubernetes® applications. Each Helm chart is a collection of files in a directory that describe a related set of Kubernetes® resources. Helm charts can be simple or complex where they contain many resources. Each chart contains version information in a Chart.yaml file. The application 202 can also be created from various template operators.

As can be seen by the stack 200, cloud-based systems provide a distinct layering of the applications, which in this example are web server 204, middleware 206, database 208, and the Kubernetes® nodes 216, 216', 216", 216'", 216"", which may be virtual processing machines, physical processing machines, and/or associated persistent volume 222, 222', 222", 222'", 222"". The separation provided by the layering allows application 202 to be run on different infrastructure, as managed via the control plane of the Kubernetes® cluster 218. Backup systems of the present teaching take advantage of this separation, using workload as the unit of backup. This is in contrast to known systems that backup based on a storage volume and/or a VM that is associated with an application. In other words, various embodiments of the system and method of the present teaching back up the application services and associated persistent volumes themselves, not a snapshot of a virtual machine that is executing those applications.

Figure 3:
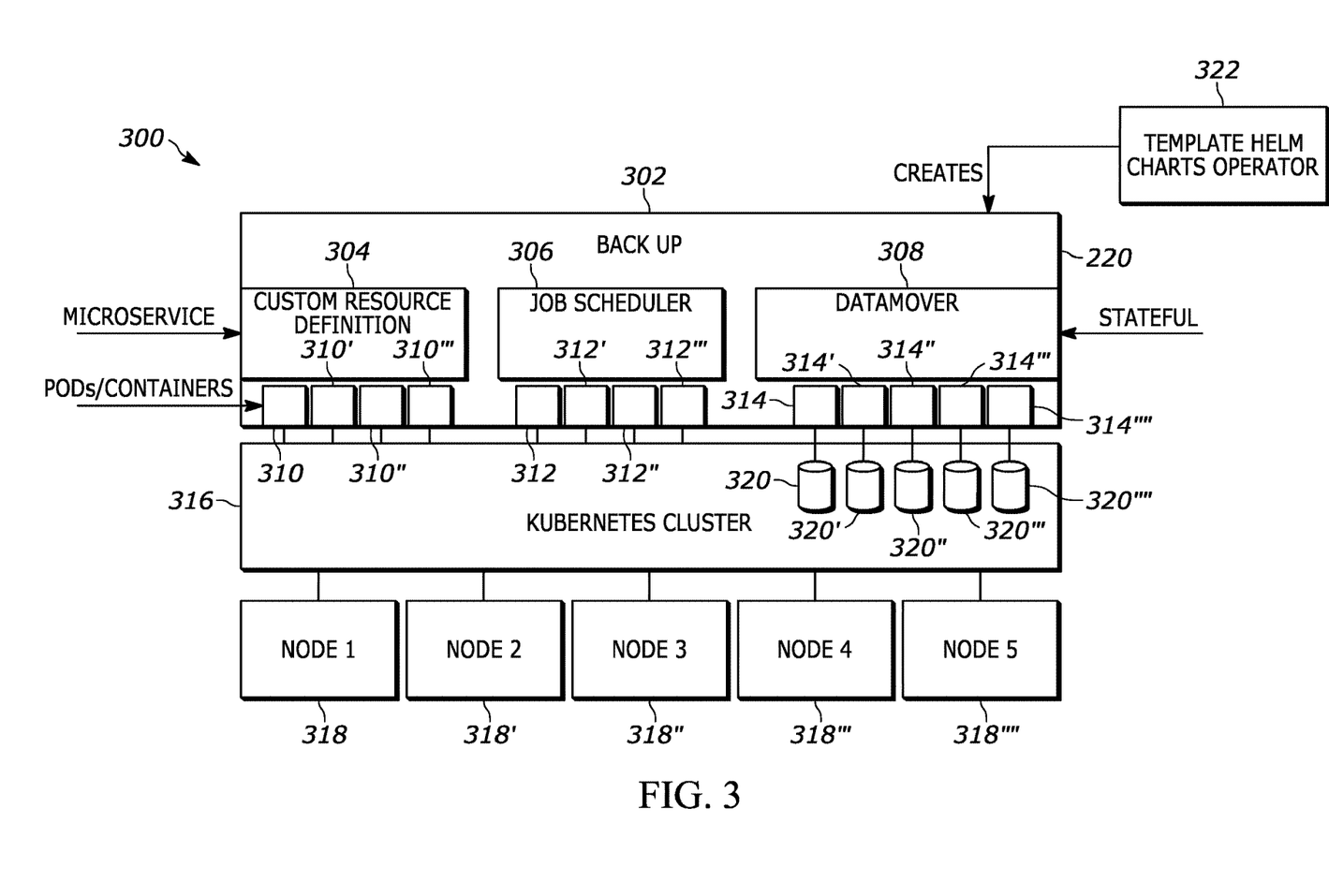
FIG. 3 illustrates a containerized backup application stack for an embodiment of a backup application of the present teaching.

One feature of the system and method to backup an application of the present teaching is that it can be run on a Kubernetes® cluster. FIG. 3 illustrates a containerized backup application stack 300 for an embodiment of a backup application of the present teaching. The backup application 302 includes three microservices 304, 306, 308. A custom resource definition service 304 defines resources that need to be backed up. A job scheduler service 306 schedules backup jobs. A datamover service 308 accepts a request to transfer data. The datamover service 308 is used to move the data from an application being backed up to a backup storage system. The custom resource definition service 304 uses four pods 310, 310', 310", 310'". The job scheduler service 306 uses four pods 312, 312', 312", 312'". The datamover service 308 uses five pods 314, 314', 314", 314'", 314"". One should understand that the number of pods described in this example for each service is only illustrative, the number of pods for each service will be different for each specific embodiment. The Kubernetes cluster 316 runs five Kubernetes® nodes 318, 318', 318", 318'", 318"", which may be virtual processing machines or physical processing machines. The datamover service 308 is stateful, and the Kubernetes® cluster 316 uses five persistent volumes 320, 320', 320", 320'", 320"" to support the datamover service 308. A restore application of the present teaching has a similar structure to the backup application 302.

Figure 4A:
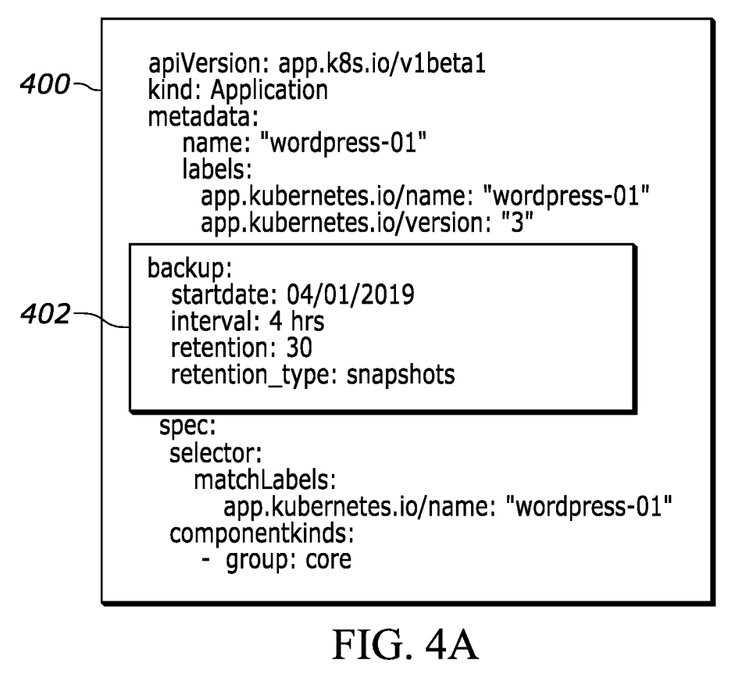
FIG. 4A illustrates a portion of a .yaml file for an embodiment of a backup application chart of the system and method of the present teaching.
Figure 4B:
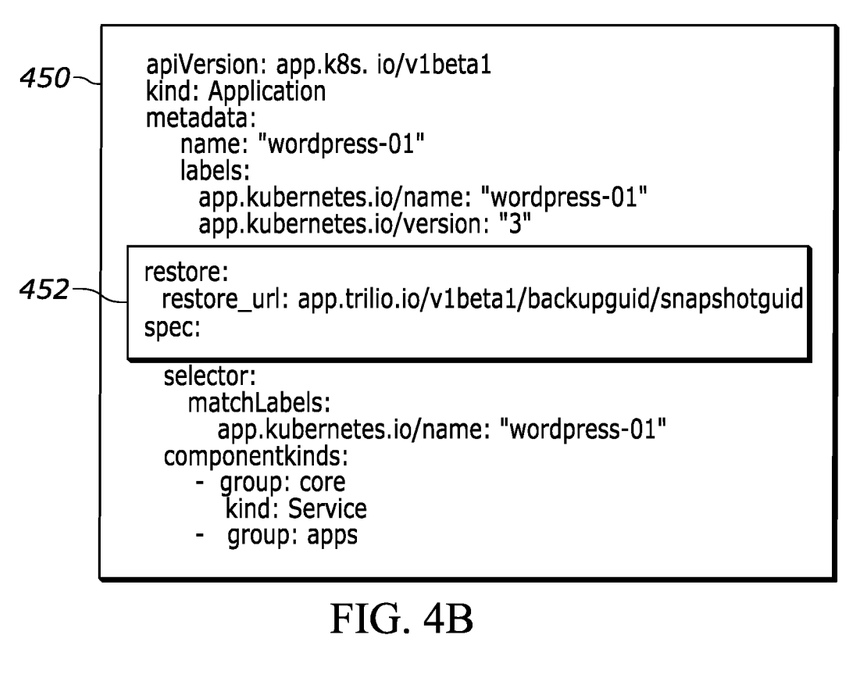
FIG. 4B illustrates a portion of a .yaml file for an embodiment of a restore chart of the system and method of the present teaching.

The backup application 302 is created by a template Helm chart operator 322. This template 322 is enhanced as described herein to support the features necessary to enable the backup application 302. FIGS. 4A and 4B illustrate an example of the enhancement.

FIG. 4A illustrates a portion of a .yaml file 400 for an embodiment of a backup application chart of the system and method of the present teaching. There is a backup entry 402 that includes a start date, the backup interval, the retention policy, and the retention type for a backup application. This backup entry 402 in the .yaml for the template chart allows users and/or administrators to specify backup policies for applications to be backed up using the system and method of the present teaching.

FIG. 4B illustrates a portion of a .yaml file 450 for an embodiment of a restore chart of the system and method of the present teaching. There is a restore entry 452 that includes a uniform resource locator (url) for the restoration. This restore entry 452 in the .yaml 450 for the template chart allows users and/or administrators to specify the network identification for the restoration in a backup application of the present teaching.

Figure 5A:
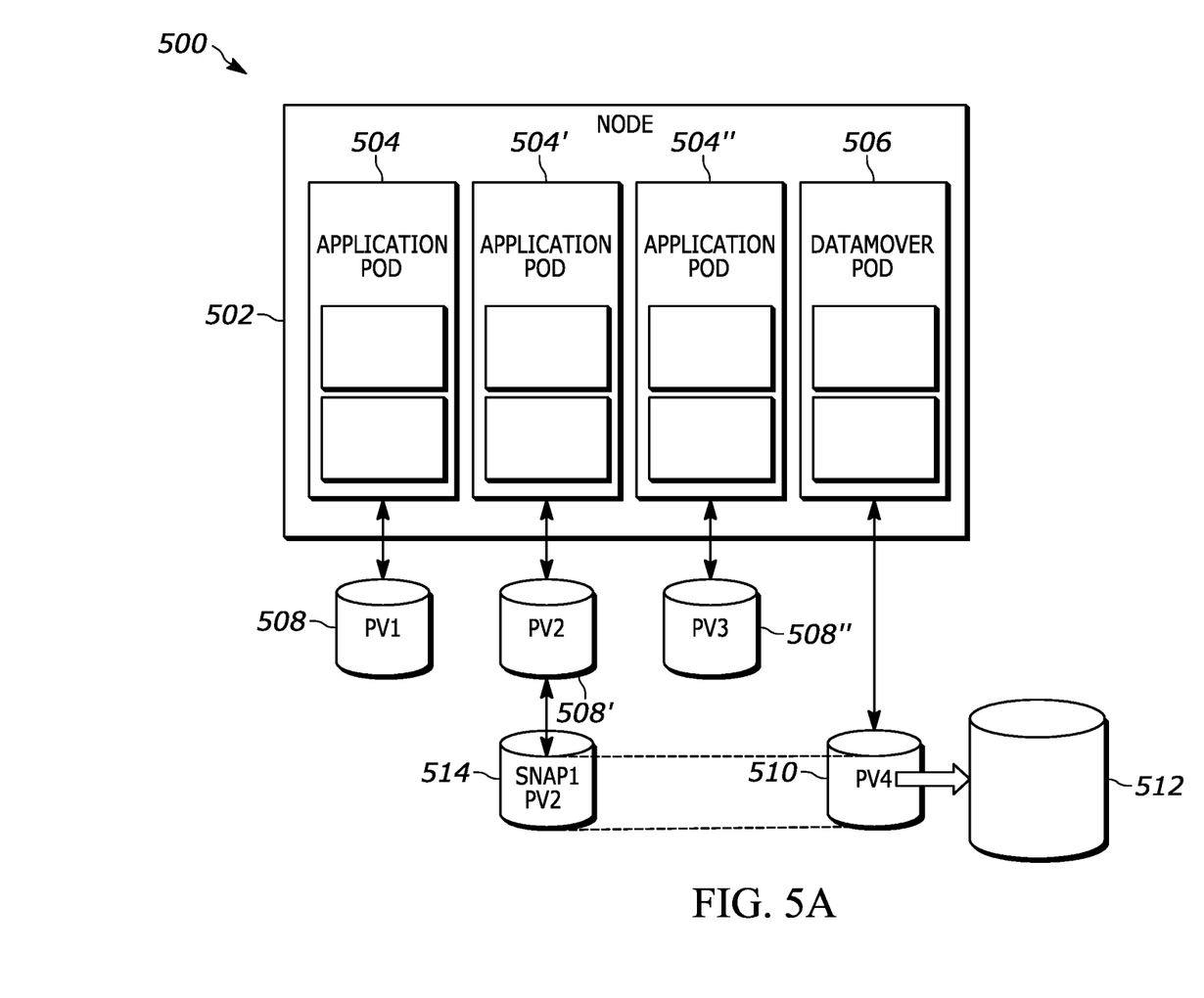
FIG. 5A illustrates an embodiment of a system executing a backup process of the present teaching.

FIG. 5A illustrates an embodiment of a system 500 executing a backup process of the present teaching. This system 500 implements a full backup. A node 502 comprises multiple application pods 504, 504', 504" and a datamover service pod 506. The application pods 504, 504', 504" need to be backed up. Each application pod 504, 504', 504" has an associated stateful set, and thus, a persistent storage volume 508, 508', 508", 510. Thus, application pod 504 is associated with the first persistent volume PV1 508. Application pod 504' is associated with the second persistent volume PV2 508'. Application pod 504" is associated with the third persistent volume PV3 508". The datamover service pod 506 is associated with the fourth persistent volume PV4 510. There is a storage system 512 that connects to the datamover service pod 506. In some embodiments, the storage system 512 is a network file system (NFS). In other embodiment, the storage system 512 is S3 storage. In yet other embodiments, multiple different storage systems are utilized. In the instance of the system 500 illustrated in FIG. 5A, application 504' is being backed up. Also shown is a snapshot 514 of the second persistent volume PV2 508'.

In one aspect of the present teaching, a backup system and method first determine the stateful set of services for an application to be backed up. Storage volumes associated with these stateful set of services are identified. Snapshots of these volumes are created. A new persistent volume is created from each snapshot. A datamover pod is created, and the new persistent volumes are attached to that pod. The datamover pod copies each of the created new persistent volumes to a network file system. The copied new persistent volumes are then detached and deleted.

Thus, an important feature of the backup process of the present teaching is that the workload is the unit of backup. The system identifies the stateful set of services, and then makes snapshots of the persistent volumes associated with those stateful services and creates new persistent volumes from the snapshot. This is in contrast to known systems that backup the entire storage volume and/or VM that is associated with an application. Importantly, various embodiments of the system and method of the present teaching back up the application services and associated storage themselves, not a snapshot of a virtual machine that is executing those applications. That is, each application pod 504, 504', 504" has an associated stateful set, and the system first identifies the stateful set of services associated with each application pod 504, 504', 504" and then makes snapshots of the persistent volumes 508, 508', 508" associated with those stateful services to create a persistent storage volume 510, which is then copied to a physical storage system 512.

Figure 5B:
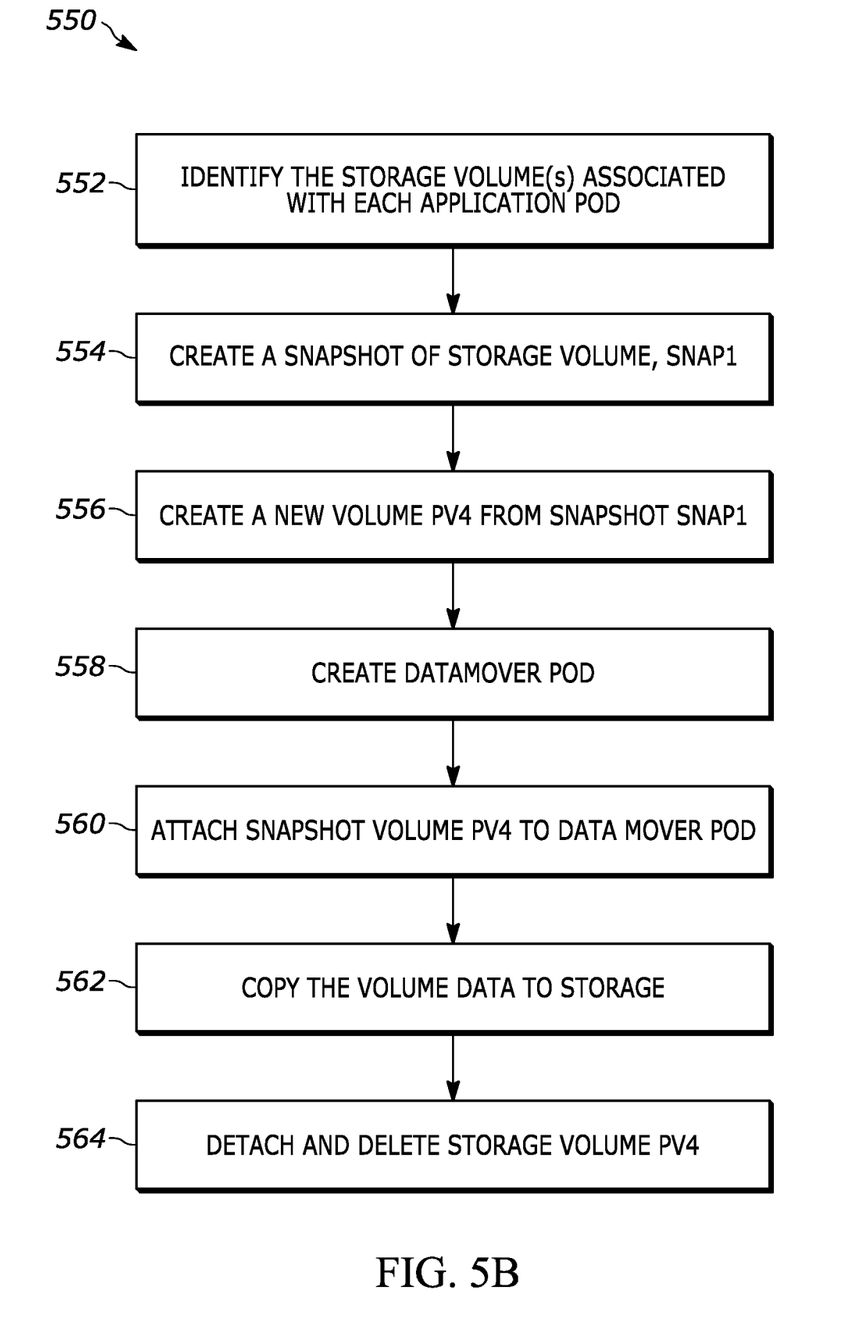
FIG. 5B illustrates an embodiment of a flow chart of a method for executing the backup process of FIG. 5A.

FIG. 5B illustrates a particular method for executing a backup process according the present teaching. FIG. 5B illustrates an embodiment of a flow chart 550 of a method for executing the backup process of FIG. 5A. Referring to both FIGS. 5A and 5B, in a first step 552, storage volumes are associated with each application-to-be backed up pod 504, 504', 504". In this step 552, the storage volumes are identified as the first persistent volume PV1 508, PV2 508' and the third persistent volume PV3 508".

In a second step 554, a snapshot of a storage volume is created. The second step 554 creates SNAP1, for example, the snapshot 514 of the second persistent volume PV2 508'. In a third step 556, a new persistent volume is created from the snapshot. In the system 500 described in connection with FIG. 5A, the fourth persistent volume PV4 510 is created from SNAP1 snapshot 514. In a fourth step 558, a datamover pod is created. This is, for example, application 506 in the system 500. Next, in a fifth step 560, the new persistent volume is attached to the datamover pod. Thus, as an example, the fourth persistent volume PV4 510 is attached to datamover service pod 506. Then in a sixth step 562, the volume data is copied to storage. For example, the datamover service 506 copies the persistent volume 510 to a storage system 512. Some embodiments use qemu-img convert to perform the copy. Finally, in the seventh step 564 the volume is detached and deleted. For example, new persistent volume 510 is detached from pod 506 and deleted.

One feature of the present teaching is that because the system operates at the workload level for backing up, the application and its backup process are largely independent of the physical and/or virtual machines and physical storage that the application is running over. As described herein, one feature of pods 504, 504', 504", 506 is that, although they represent an integrated application/service, they are not restricted to run on the same virtual or physical machine. In fact, in some embodiments, an application restored from a back-up according to the present teaching can run over various combinations of different virtual machines and/or physical machines that may or may not be the same as the virtual or physical machine originally executing the application.

Figure 6A:
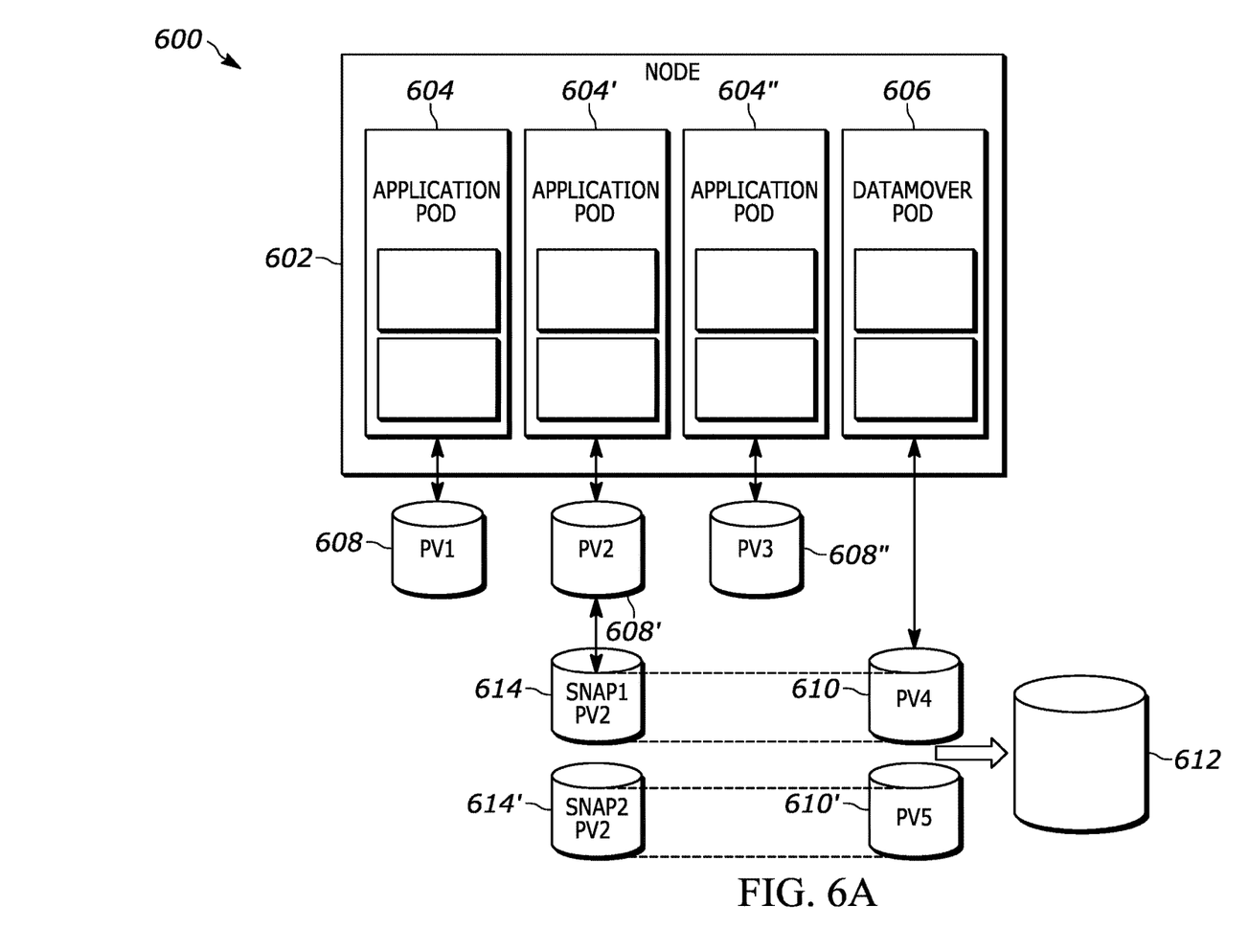
FIG. 6A illustrates an embodiment of a system executing an incremental backup process of the present teaching.

FIG. 6A illustrates an embodiment of a system 600 executing an incremental backup process of the present teaching. A node 602 comprises multiple application pods 604, 604', 604" and a datamover service pod 606. The application pods 604, 604', 604" need to be backed up. Each application pod 604, 604', 604" has an associated stateful set, and thus, a persistent storage volume 608, 608', 608". Thus, application pod 604 is associated with the first persistent volume PV1 608, application pod 604' is associated with the second persistent volume PV2 608', application pod 604" is associated with the third persistent volume PV3 608". The datamover service pod 606 is associated with the fourth persistent volume PV4 610 and the fifth persistent volume PV5 610'. There is a storage system 612 (e.g. NFS and/or S3) that connects to the datamover service pod 606. In the instance of the system 600 illustrated in FIG. 6A, application service 604' is being backed up in an incremental fashion. As such, there are two snapshots 614, 614' of PV2 608'. Snapshot 614 SNAP1 was taken at the full backup (e.g. 514 of FIG. 5A). Snapshot 614' SNAP2 is the snapshot taken at the incremental backup time.

Figure 6B:
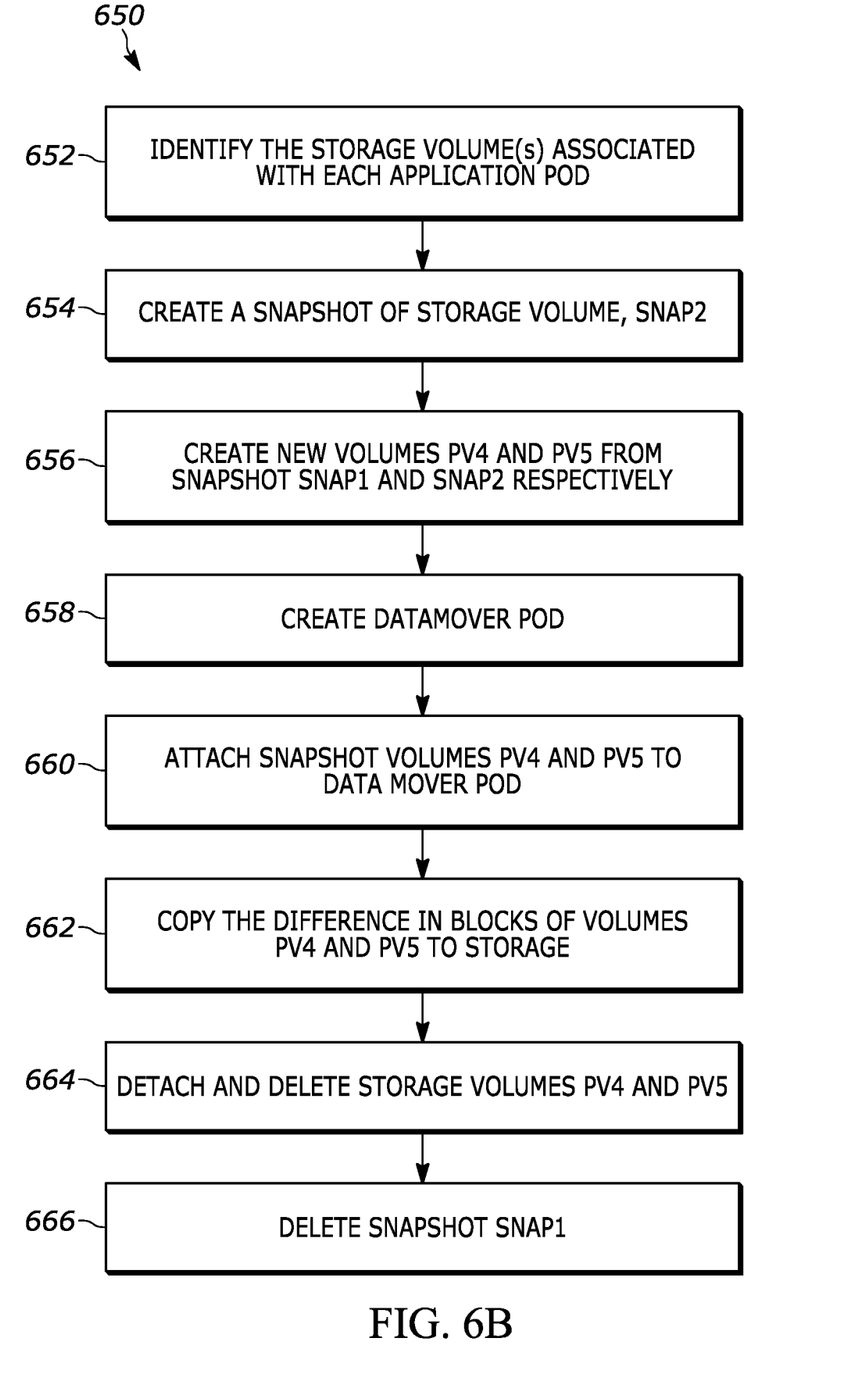
FIG. 6B illustrates an embodiment of a flow chart of a method for executing the incremental backup process described in connection with FIG. 6A.

FIG. 6B illustrates an embodiment of a flow chart 650 of a method for executing the incremental backup process described in connection FIG. 6A. Referring to both FIGS. 6A and 6B, in a first step 652, the storage volumes are associated with each service in the application-to-be-backed up pod, for example, applications 604, 604', 604". In this first step 652, for example, the storage volumes are identified as the first persistent volume PV1 608, the second persistent volume PV2 608', and the third persistent volume PV3 608".

In a second step 654, a snapshot of the storage volume is created. The second step 654 creates, for example, snapshot 614' SNAP2 at the incremental backup time, the snapshot 614' of the second persistent volume PV2 608'. In a third step 656, a new persistent volume is created from the available snapshots. For example, the existing snapshot 614, and the new snapshot 614' are used. In system 600 described in connection with FIG. 6A, the fourth persistent volume PV4 610 is created from SNAP1 snapshot 614 and the fifth persistent volume PV5 610' is created from snapshot 614'.

In a fourth step 658, a datamover pod is created. For example, this can be application 606 in the system 600 described in connection with FIG. 6A. Next, in a fifth step 660, snapshot volumes are attached to the appropriate data mover pod. For example, the new persistent volumes 610, 610' are attached to the datamover pod 606. Difference blocks are determined between the new persistent volumes 610, 610' of each snapshot. Then, in the sixth step 662, the difference in blocks of volumes are copied to storage. For example, the datamover service 606 copies the difference blocks of persistent volumes 610, 610 to the storage system 612. Some methods use qemu-img convert to perform the copy. Then, in the seventh step 664, the storage volumes are detached and deleted. For example, the new persistent volumes 610, 610' are detached from pod 606 and deleted. In an eight step 666, the snapshot is deleted. For example, the first snapshot 614, SNAP1 is deleted.

Figure 7A:
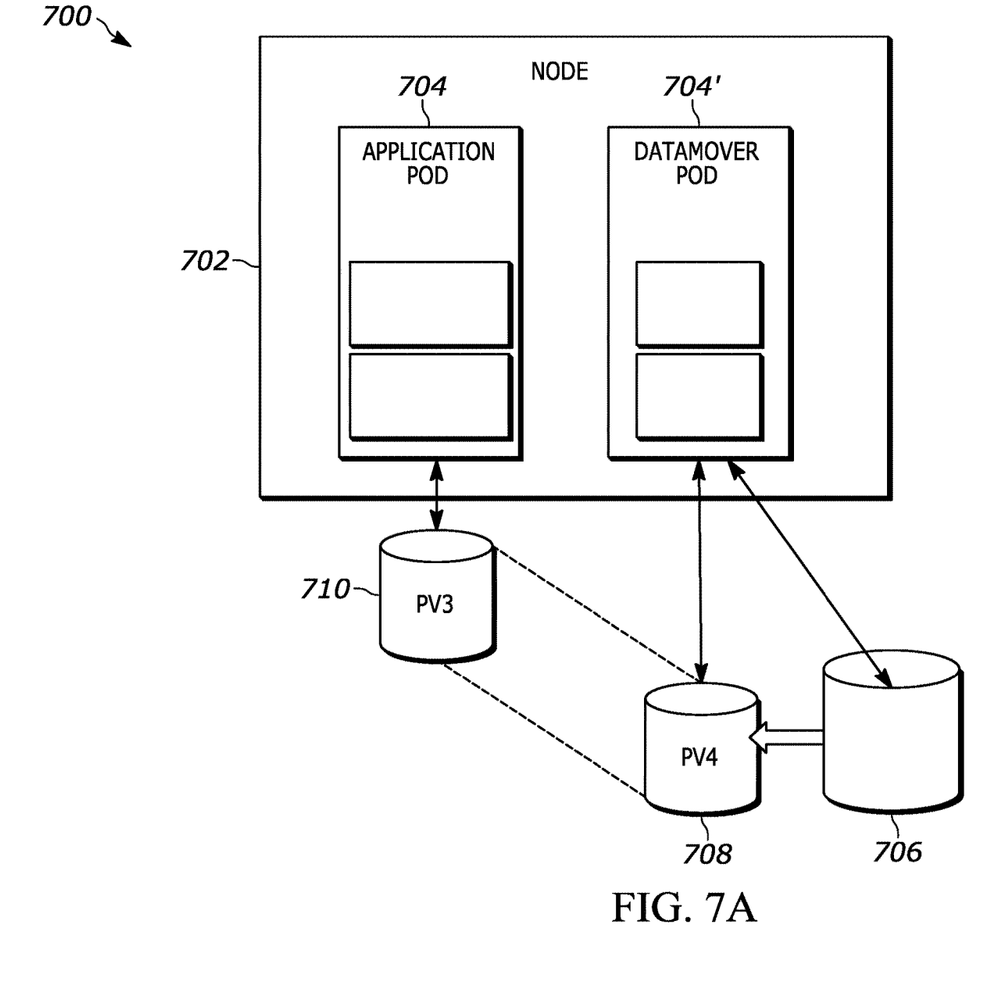
FIG. 7A illustrates an embodiment of a system to restore in a backup application of the present teaching.

FIG. 7A illustrates an embodiment of a system 700 for restoration in a backup application of the present teaching. A node 702 executes two applications 704, 704'. One application 704 is the application that needs to be restored, and one application is a datamover service 704' executing on a pod. A storage system 706 holds the data from an earlier backup that is used to restore. There are two persistent volumes 708, 710.

Figure 7B:
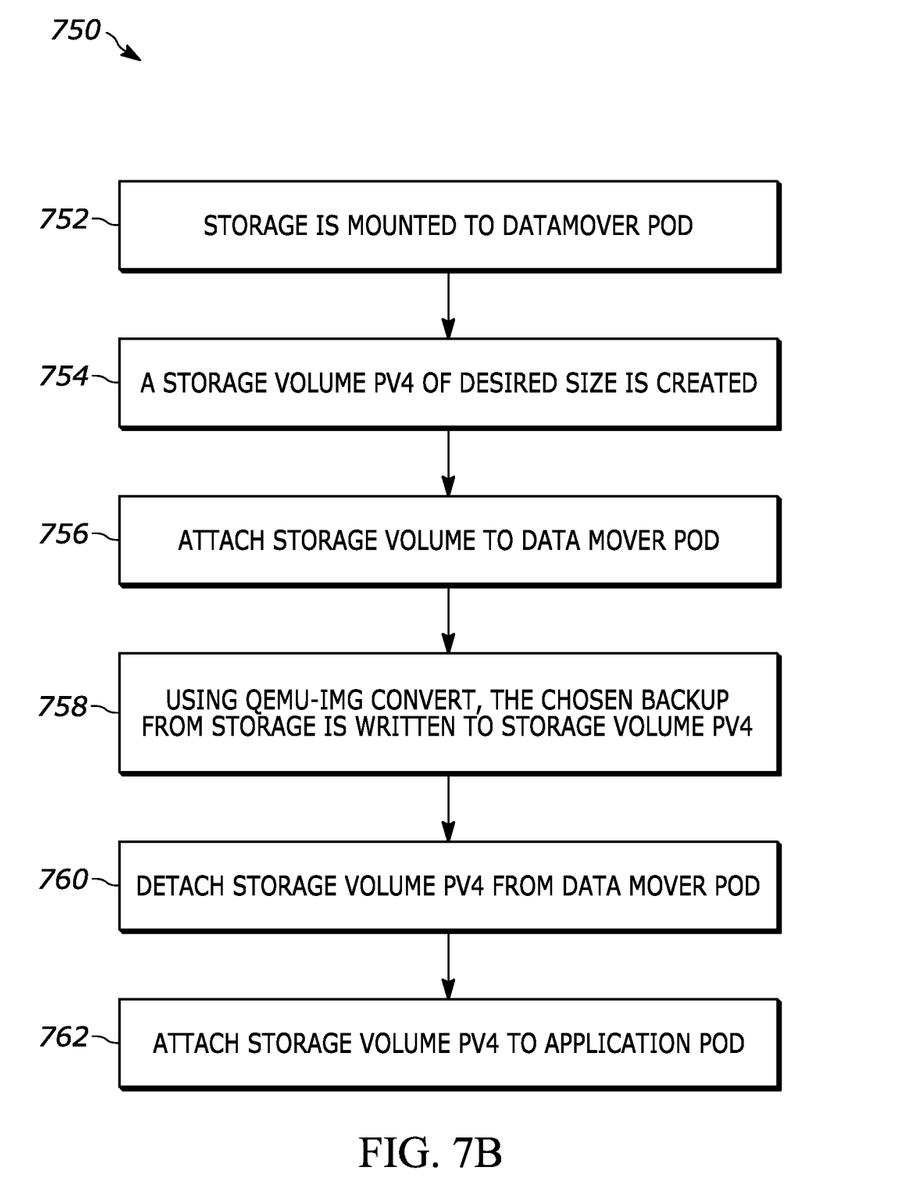
FIG. 7B illustrates a flow chart for a method to restore in a backup application of the present teaching.

FIG. 7B illustrates a flow chart 750 for a method to restore in a backup application of the present teaching. Referring to both FIGS. 7A and 7B, in a first step 752, storage is mounted to a datamover pod. For example, the storage system is mounted to the datamover pod 704'. In a second step 754, a storage volume of desired size is created. For example, a fourth persistent volume 708 of a desired size is created. In a third step 756, the storage volume is attached to a data mover pod. For example, the fourth persistent volume 708 is attached to the datamover pod 704' in embodiment of the third step 756. In a fourth step 758, the chosen backup from storage is written to a storage volume. For example, the appropriate backup data from the storage system 706 is written to the third persistent volume 708. In some embodiments, the datamover pod 704' uses qemu-img to convert and write the data. In a fifth step 760, the storage volume is detached from the data mover pod. The sixth step 762 attaches the storage volume to the application pod. For example, the fourth persistent volume 708 with the written data is detached from the data mover pod to become the third persistent volume 710 that is attached to the application service pod 704. In this way, the application is restored.

Figure 8:
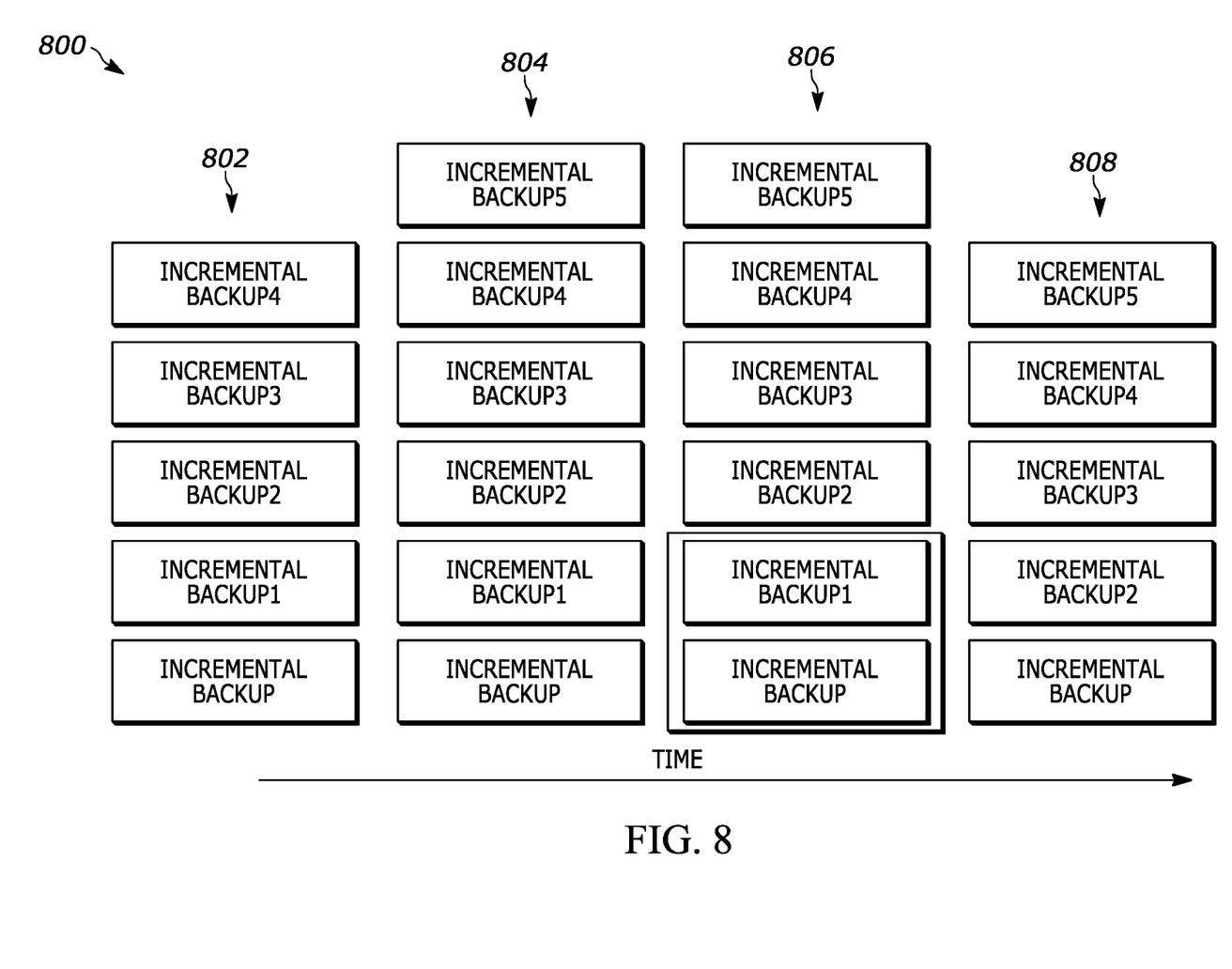
FIG. 8 illustrates an embodiment of a time progression of backups that are maintained in a backup application of the present teaching.

FIG. 8 illustrates an embodiment of a time progression 800 of backups that are maintained in a backup application of the present teaching. In this time progression 800, the backup retention policy is five snapshots. Thus, at a first time 802, the system maintains a full backup, and has accumulated four snapshots from four previous incremental backups. At a next time 804, the system executes the fifth incremental backup. This incremental backup is also retained. However, at the next incremental backup time 806, a full backup is migrated to contain the information from the first incremental backup. Then, at the next time 808, the system has the new full backup file and incremental files from the second through fifth incremental backups.

Thus, the method cycles through the incremental backups, always maintaining a full backup and the most recent four incremental backups. It should be understood that numerous other retention policies with different numbers of incremental backups retained are within the scope of the present teaching, and can operate in the same cyclical way.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A computer-implemented method of backing up a containerized application using a datamover service, the method comprising:
   a) determining a stateful set of services of the containerized application to be backed up;
   b) identifying a persistent volume associated with the determined stateful set of services of the containerized application;
   c) creating a first snapshot of the identified persistent volume at a first time;
   d) creating a second snapshot of the identified persistent volume at a second time;
   e) creating a first new persistent volume from the first snapshot;
   f) creating a second new persistent volume from the second snapshot;
   g) attaching the created first new persistent volume and the created second new persistent volume to a datamover service;
   h) determining difference blocks between the created first new persistent volume and the created second new persistent volume using the data mover service; and
   copying the determined difference blocks to a network file system using the datamover service, thereby creating backup data stored in a storage system.

2. The computer-implemented method of claim 1 wherein the containerized application to be backed up comprises at least one of a web server service, a middleware service, and a database service.

3. The computer-implemented method of claim 1 wherein the first snapshot is created at a full backup time.

4. The computer-implemented method of claim 1 wherein the second snapshot is created at an incremental backup time.

5. The computer-implemented method of claim 1 further comprising creating the application to be backed up from a template Helm chart.

6. The computer-implemented method of claim 1 further comprising creating the application to be backed up from a template operator.

7. The computer-implemented method of claim 1 further comprising restoring the application to be backed up.

8. The computer-implemented method of claim 7 wherein restoring the application to be backed up comprises:
　a) mounting the storage system to the datamover service;
　b) creating a storage volume;
　c) attaching the created storage volume to the datamover service;
　d) copying data from the storage system to the storage volume;
　e) detaching the storage volume from the datamover service; and
　f) attaching the storage volume to the determined stateful set of services of the containerized application that was backed up.

9. A computer-implemented method of backing up a cloud-based application using a datamover service, the method comprising:
　a) determining a stateful set of services of the cloud-based application to be backed up;
　b) identifying a persistent volume associated with the determined stateful set of services of the cloud-based application;
　c) creating a first snapshot of the identified persistent volume at a first time;
　d) creating a second snapshot of the identified persistent volume at a second time;
　e) creating a new persistent volume from the first snapshot;
　f) creating a second new persistent volume from the second snapshot;
　g) attaching the created new first persistent volume and the created second new persistent volume to a datamover service;
　h) determining difference blocks between the created first new persistent volume and the created second new persistent volume using the data mover service; and
　copying the determined difference blocks to a storage system using the datamover service, thereby creating backup data stored in the storage system.

10. The computer-implemented method of claim 9 wherein the cloud-based application to be backed up is executed using a hybrid cloud.

11. The computer-implemented method of claim 9 wherein the cloud-based application to be backed up comprises at least one of a web server service, a middleware service, or a database service.

12. The computer-implemented method of claim 9 wherein the first snapshot is created at a full backup time.

13. The computer-implemented method of claim 9 wherein the second snapshot is created at an incremental backup time.

14. The computer-implemented method of claim 9 further comprising initiating a backup of the cloud-based application to be backed up using a .yaml file.

15. The computer-implemented method of claim 9 further comprising restoring the cloud-based application to be backed up.

16. The computer-implemented method of claim 15 wherein restoring the cloud-based application to be backed up comprises:
　a) mounting the storage system to the datamover service;
　b) creating a storage volume;
　c) attaching the created storage volume to the datamover service;
　d) copying data from the storage system to the storage volume; and
　e) detaching the storage volume from the datamover service and attaching the storage volume to the determined stateful set of services of the cloud-based application that was backed up.

17. A containerized application backup system comprising:
　a) a node comprising a processor that execute a containerized application to be backed up and that executes a datamover service;
　b) a persistent volume electrically connected to the node; and
　c) a storage system electrically connected to the node and electrically connected to a first new persistent volume and a second new persistent volume,
　wherein the processor determines a stateful set of services of the containerized application to be backed up, identifies the persistent volume associated with the determined stateful set of services of the containerized application, creates a first snapshot of the identified persistent volume at a first time, creates the first new persistent volume from the first snapshot, attaches the created first new persistent volume to the datamover service, creates a second snapshot of the identified persistent volume at a second time, creates the second new persistent volume from the second snapshot, attaches the created second new persistent volume to the datamover service, determines difference blocks between the created first new persistent volume and the created second new persistent volume and copies the determined difference blocks to a network file system using the datamover service, thereby creating backup data stored in the storage system.

18. The containerized application backup system of claim 17 wherein the processor in the node comprise at least one virtual processing machine.

19. The containerized application backup system of claim 17 wherein the processor in the node comprises at least one physical processing machines.

20. The containerized application backup system of claim 17 wherein the storage system comprises a network file system (NFS) storage system.

21. The containerized application backup system of claim 17 wherein the storage system comprises an object storage system.

22. The containerized application backup system of claim 17 wherein the storage system comprises a S3 storage system.

* * * * *